US006898574B1

(12) United States Patent
Regan (10) Patent No.: US 6,898,574 B1
(45) Date of Patent: May 24, 2005

(54) LENDER AND INSURER TRANSACTION PROCESSING SYSTEM AND METHOD

(76) Inventor: John Francis Regan, 611 Lonsdale Road, Toronto, Ontario (CA), M5P 2R8

(*) Notice: Subject to any disclaimer, the term of this patent is extended or adjusted under 35 U.S.C. 154(b) by 0 days.

(21) Appl. No.: 09/188,827

(22) Filed: Nov. 9, 1998

(51) Int. Cl.[7] .............................................. G06F 17/60
(52) U.S. Cl. .......................................... 705/38; 705/35
(58) Field of Search ............................. 705/30, 35, 38, 705/40, 1, 4, 8, 9, 19; 706/925; 902/40; 235/379

(56) References Cited

U.S. PATENT DOCUMENTS

| | | | |
|---|---|---|---|
| 4,774,664 A | | 9/1988 | Campbell |
| 4,876,648 A | * | 10/1989 | Lloyd ........................... 705/38 |
| 5,182,705 A | * | 1/1993 | Barr et al. ...................... 705/4 |
| 5,274,547 A | | 12/1993 | Zoffel |
| 5,323,315 A | * | 6/1994 | Highbloom ................... 705/38 |
| 5,521,815 A | | 5/1996 | Rose, Jr. |
| 5,611,052 A | * | 3/1997 | Dykstra et al. ................ 705/38 |
| 5,809,478 A | * | 9/1998 | Greco et al. .................... 705/4 |
| 5,819,230 A | * | 10/1998 | Christie et al. ................. 705/4 |
| 5,870,721 A | * | 2/1999 | Norris ........................... 705/38 |
| 5,878,403 A | * | 3/1999 | DeFrancesco ................. 705/38 |
| 5,903,873 A | * | 5/1999 | Peterson et al. ................ 705/4 |
| 5,930,775 A | * | 7/1999 | McCauley et al. ............ 705/38 |
| 5,940,812 A | * | 8/1999 | Tengel et al. .................. 705/38 |
| 5,950,169 A | * | 9/1999 | Borghesi et al. ............... 705/4 |
| 5,960,404 A | * | 9/1999 | Chaar et al. .................... 705/8 |
| 5,983,206 A | * | 11/1999 | Oppenheimer ............... 705/38 |
| 5,991,733 A | * | 11/1999 | Aleia et al. ..................... 705/8 |
| 5,995,947 A | * | 11/1999 | Fraser et al. ................... 705/38 |
| 6,016,479 A | * | 1/2000 | Taricani, Jr. .................. 705/19 |
| 6,049,784 A | * | 4/2000 | Weatherly et al. ............ 705/38 |
| 6,098,052 A | * | 8/2000 | Kosiba et al. ................. 705/40 |
| 6,338,074 B1 | * | 1/2002 | Poindexter et al. .......... 715/500 |
| 2004/0019558 A1 | * | 1/2004 | McDonald et al. ........... 705/38 |

FOREIGN PATENT DOCUMENTS

EP          0840244 A     5/1998

OTHER PUBLICATIONS

Luedders, Dean R., "Practical REO Management", Mortgage Banking, vol. 52, No. 5, pp 32–39, Feb. 1992.*

Sutton et al, "The Process of REO Management", Journal of Property Management, vol. 55, No. 4, p. 32, Jul.–Aug. 1990.*

Anonymous, "FIS Technology's Software is Well–Suited for B&C", Origination News, vol. 6, No. 11, p. 56, Aug. 1997.*

Anonymous, "Stockholder Systems, Inc. Announces Acquisition of Mortgage Loan Software Line", Press Release, Dialog File 813:PR Newswire, Oct. 2, 1991.*

Anonymous, "Statewide Lender's Services, Inc. Designated as Freddie Mac Trustee for Loan Foreclosures; 75 Companies Applied, 6 Chosen", Business Wire, Dialog File 621:New Product Announcement, Mar. 19, 1998.*

Ocwen Financial Corporation, "Ocwen Financial Corporation Forms Technology Subsidiary to Provide Software to Mortgage and Real Estate Industries", PR Newswire, Dialog File 621:New Product Announcements, May 12, 1998.*

Personal Optimized Decision/Transaction Program IBM Technical Disclosure Bulletin, US, IBM Corp, New York. vol. 38, No. 1, Jan. 1, 1995 pp. 83–84, XP000498696 ISSN: 0018/8689.

Patent Abstracts of Japan vo. 1999, No. 01, Jan. 29, 1999 & JP 10 275191 A (Hitachi Ltd.) Oct. 13, 1998 abstract & US 6049787A (Tominaga Masasuke et al) Apr. 11, 2000.

* cited by examiner

*Primary Examiner*—John W. Hayes (57) ABSTRACT

A system and method for transaction processing includes a central repository of transaction information which can be accessed by a variety of participants who may be located over a wide geographic area in the recovery process of a property unit such as a vehicle or other collateral. Interfacing with a variety of computer systems over a communication network, such as the Internet, allows interchange of data relating to the recovery process and centralized coordination of the recovery process.

14 Claims, 3 Drawing Sheets

LENDER AND INSURER TRANSACTION PROCESSING SYSTEM AND METHOD

FIELD OF THE INVENTION

The present invention relates to transaction processing computer systems, in particular, systems for assisting lenders or insurers in the efficient processing of transactions within their scope of business.

BACKGROUND INFORMATION

For a lender or an insurer, the processing of a transaction entails multiple steps. For example, in a transaction involving a secured loan for the purchase of an item, a lender would receive a loan application, evaluate (e.g., adjudicate, credit score) the applicant, and verify information contained in the application. The loan evaluation process may further include, for example, searches or inquiries of various commercial and government databases to obtain additional information needed to make a loan decision. The lender inquiry may then require to be posted at a credit bureau.

If the loan were granted, then the lender would generate a specified loan agreement for execution by the borrower. The lender would then generally take a security interest if financing a property unit (e.g., the collateral). The rules for recording a security interest may vary by jurisdiction or item (e.g., the U.C.C. or title interest in the U.S. and the P.P.S.A. in Canada) and are generally effected at the county, state, provincial, or federal level. Recording the security interest can be performed, for example, either manually by the lender or via a service that provides the recording (e.g., via facsimile or electronically). Once a transaction is initially processed, tracing an asset, individual, or entity and the recovery of an asset or loan balance due to fraud, theft, or default may require access to, and the involvement of, a multitude of agents and governing agencies and can require substantial resources. Such participating agents may be located over a wide area and need access to a variety of information, documents and databases in a timely manner. For example, upon occurrence of a default condition (e.g., failure to make loan payments to a lender), recovery of the loan collateral (e.g., a property unit) could be voluntary or involuntary. If there was a voluntary surrender of the collateral to the lender, the services of a transporter, appraiser, liquidator, receiver, or attorney might still be needed to complete the recovery process. If the recovery process is involuntary, then in addition to the services identified above, the lender might also need the services of an investigator/recovery, repossession agent/bailiff, skiptrace agent or collection agency to recover the collateral.

In a conventional arrangement, a lender or insurer transaction involves extensive human and material resources at each stage of the transaction for manual processing, multiple transcriptions of common information, numerous record searches, and multiple assignments to various agents. Only limited access to pertinent information in a timely manner is available for those who need it. Accordingly, in the conventional process, the transaction typically requires multiple telephone communications, facsimiles, microfiches, hand written documents and printed forms. Each action in the process gives rise to the opportunity for the introduction of errors and the reduction of centralized control by a lender or insurer. Further, conventional systems do not transaction.

As such, there is a need for a system which can automatically, on-line link and, based on an access control permission granting process, provide each of a potentially large number of widely distributed participants with specific instructions, relevant information, searches, registrations and required documents in a timely manner to effect their part in the transaction and to create efficiencies at all stages of the transaction process.

SUMMARY OF THE INVENTION

The present invention includes an exemplary system and method which provides lenders or insurers on-line processing of transactions via a central data repository with links to various private and public agencies. The system according to an embodiment of the present invention provides in a timely manner on-line access or links to a variety of information, instructions, documents, and databases to authorized agents or persons involved in the transaction that maybe located over a wide geographical area. Further, access to the system can be controlled, for example, via an access permission granting process.

The system of the present invention includes, for example, a central data repository (e.g., a relational database) and interfaces (e.g., software modules) that provide the capability to read data from and write data to the data repository. The system can utilize, for example, a relational database computer program running on a client-server or Internet based architecture and using a WINDOWS graphical user interface.

For example, an Application/Customer Profile Module according to an embodiment of the present invention captures and stores data on the customer and the transaction at the time a customer applies for a loan or insurance. A lender, insurer, dealer, broker or anyone seeking financing or insurance can use this module to input required information in the central repository.

Upon completion of the application/customer profile, information required by the lender or insurer for their adjudication processing can be, for example, electronically provided from the central repository of the present invention via an Adjudication Extract Module and uploaded the lenders/insurer's proprietary adjudication process or the Adjudication Module of the present invention. The lender or insurer can request required searches from a host of commercial and government agencies via a Search Module of the present invention for information and/or documents relevant to their adjudication process specification requirements. The Search Module also can provide the user with the current fees, charges and balances for the search costs on their account. Desired documents and information from a search can be stored in the central repository.

A Document Module according to an embodiment of the present invention generates, warehouses, and electronically delivers database driven or digitally imaged documents (including, for example, mortgages, general security agreements, chattel mortgages, conditional sales contracts, leases, customer identification, policies, registrations, titles, appraisals, bills of sale, statutory notices, or any other documents deemed necessary or required) for processing, confirming or realizing upon a loan or insurance transaction. The database driven documents are, for example, electronically generated and delivered to the required user in a standardized format consistent with the required specification of the particular lender or insurer based on the transaction type and jurisdictional variance of the transaction.

These documents are made available, for example based on a SQL query of the central repository following an access control permission granting process, authorization levels, the identity of the requesting party and the type of transaction contemplated for their use, (e.g., personal, audit or recovery reasons). For example, in a loan default and collateral recovery process, a lender would select a recovery agent and grant account access permission to the agent. Upon receipt of the permission, the recovery agent would then be able to access the central repository for the assignment and instructions from the lender. The agent would be allowed to retrieve a digital copy of the security agreement or lien/title registration and generate a specified database driven default notice or seizure notice. Upon seizure of the collateral, a specified database driven statutory notice of intention to sell a property unit could be generated according to an embodiment of the present invention. In an insurance claim process, for example, an adjuster could retrieve a digital copy of the policy, application or appraisal and upon completion of the required task generate a database driven proof of claim. The imaged and database driven documents are accessible from the central repository.

Upon the approval of a transaction, a Registration Module according to an embodiment of the present invention can register, file, report, account for and provide online access to or links for registrations of, for example, liens, titles, licenses, writs, claims, transactions, thefts, frauds, defaults, recoveries, seizures, legal actions or notification of an update to a credit bureau in any given jurisdiction such as a municipality, county, province, state, or federal authority via electronic access to a governing agency or local agent. If the governing agency cannot provide electronic registrations, the system and method according to an embodiment of the present invention can generate the required form document (e.g., database driven registration form) and deliver the form to an agent for registration via the Document Module. The Registration Module also can provide the user with the current fees, charges and balances for the registration costs on their account. The results of these transactions can be retained in the central repository.

Once the transaction is completed, an Electronic Invoice, Billing is and Payment Process Module according to an embodiment of the present invention can provide electronic invoicing or payment processing of the transaction.

Upon notification of a recovery condition, a Recovery Module can direct the respective information and recovery assignment to a variety of commissioned and non-commissioned agents such as asset managers, investigating agents, skip tracers, recovery agents, bailiffs, impound yards, shipping agents, appraisers, adjusters, sales agents, attorneys, receivers, trustees, property managers, real estate brokers, escrow or title agents, insurance carriers, collection agencies, reporting agencies, credit bureaus, police, customs, INS (Immigration, Naturalization Services), NICB (National Insurance Crime Bureau), ICPB (Insurance Crime Prevention Bureau), INTERPOL, IRS (Internal Revenue Service), Revenue Canada, Receiver General or any other governing agency required, etc. In combination with the Document Module, Search Module and Recovery Module, and subject to, for example, an access control permission granting process, the present invention provides electronic communication and access for the agents to pertinent pre-selected, instruction, information, searches, and documents as may be required by those agents to complete their assignment task.

The system of the present invention can communicate with users and a variety of other systems over a conventional communication network, such as a proprietary connection (e.g., direct connection or dial up) or over a public network (e.g., the Internet).

DETAILED DESCRIPTION OF THE INVENTION

Figure 1:
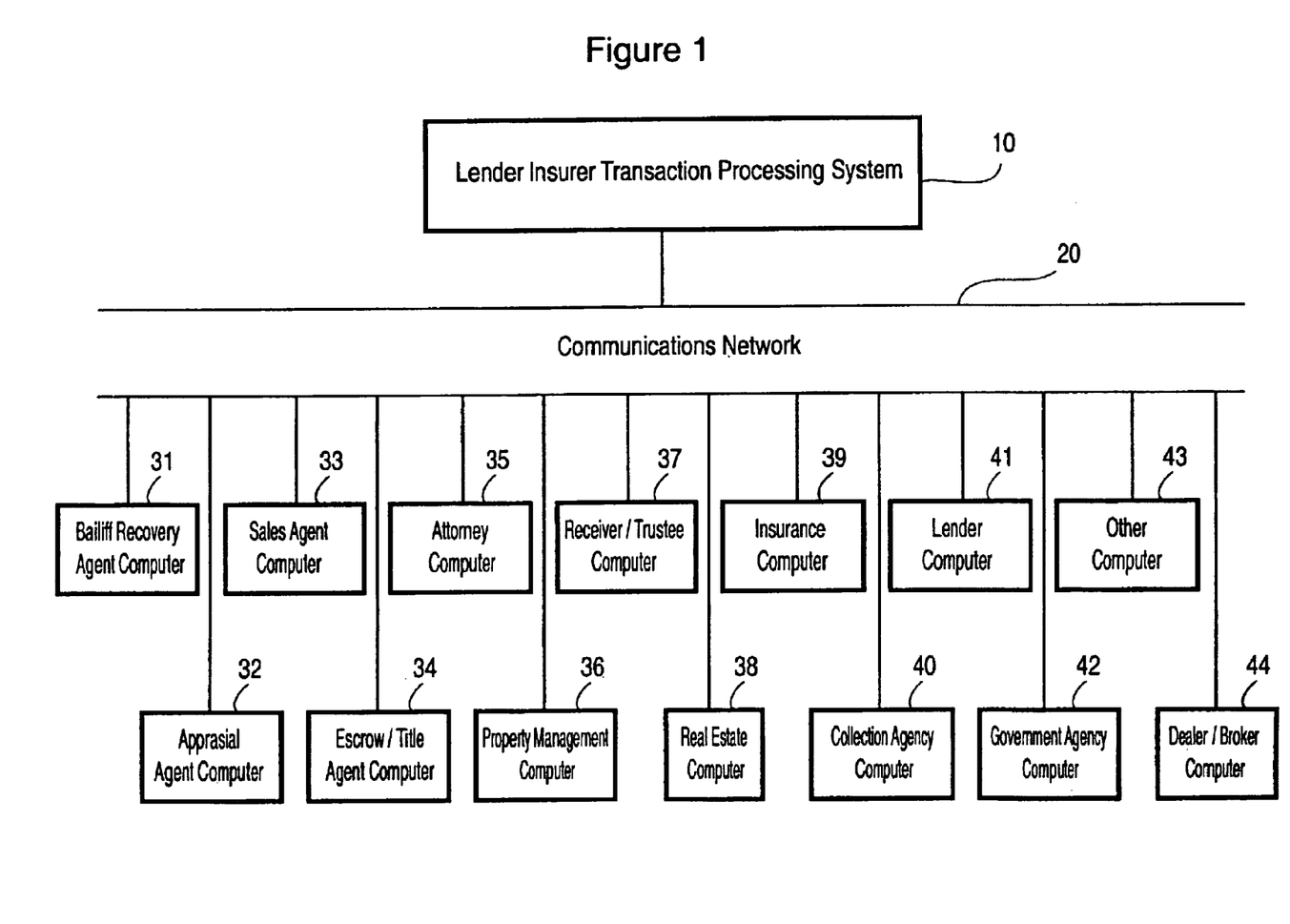
FIG. 1 is an exemplary block diagram of a communications network with the system of the present invention.

FIG. 1 is a block diagram showing a transaction processing system in accordance with an embodiment of the present invention in communication with a plurality of other computer systems 31–44. The transaction processing system 10 can include, for example, a mainframe computer or server computer, such as an IBM mainframe or NT server that executes a computer program operating in accordance with the method for transaction processing according to an embodiment of the present invention. For example, transaction processing system 10 can be implemented in accordance with the present invention with a conventional database management system such as SQL SERVER on a mini computer, personal computer, or mainframe computer to implement the functions described below with, for example, reference to FIG. 2. The various computers 10 and 31–44 are coupled to a communication network 20 that allows them to communicate with each other. The communication network 20 can be, for example, proprietary (e.g., a direct or dial-up connection) or public (e.g., the Internet).

As shown in FIG. 1, the transaction processing system 10 communicates with the plurality of other computer systems, which may be involved in lending, insuring, registry, searching, or recovery transactions. Such other computer system may include, for example, one or more of a recovery agent (e.g., bailiff) computer 31, an appraisal agent computer 32, a sales agent computer 33, an escrow/title agent computer 34, an attorney computer 35, a property management computer 36, a receiver/trustee computer 37, a real estate agency computer 38, an insurance computer 39, a collection agent computer 40, a lender computer 41, a government agency computer 42, a dealer/broker computer 44 and any other user computer 43 for entities requiring access to the transaction processing system 10. The computers 31–44 can be, for example, client computers in a client server architecture, the server computer being the transaction processing system 10. The computer 31–44 can include, for example, conventional personal desktop computers located at respective commissioned and non-commissioned agent locations to provide the agent access to the transaction processing system 10.

The operation of the transaction processing system 10 of the present invention and the interactions between the system 10 and the various computer systems 31–44 will now be described with reference to FIG. 2.

Figure 2:
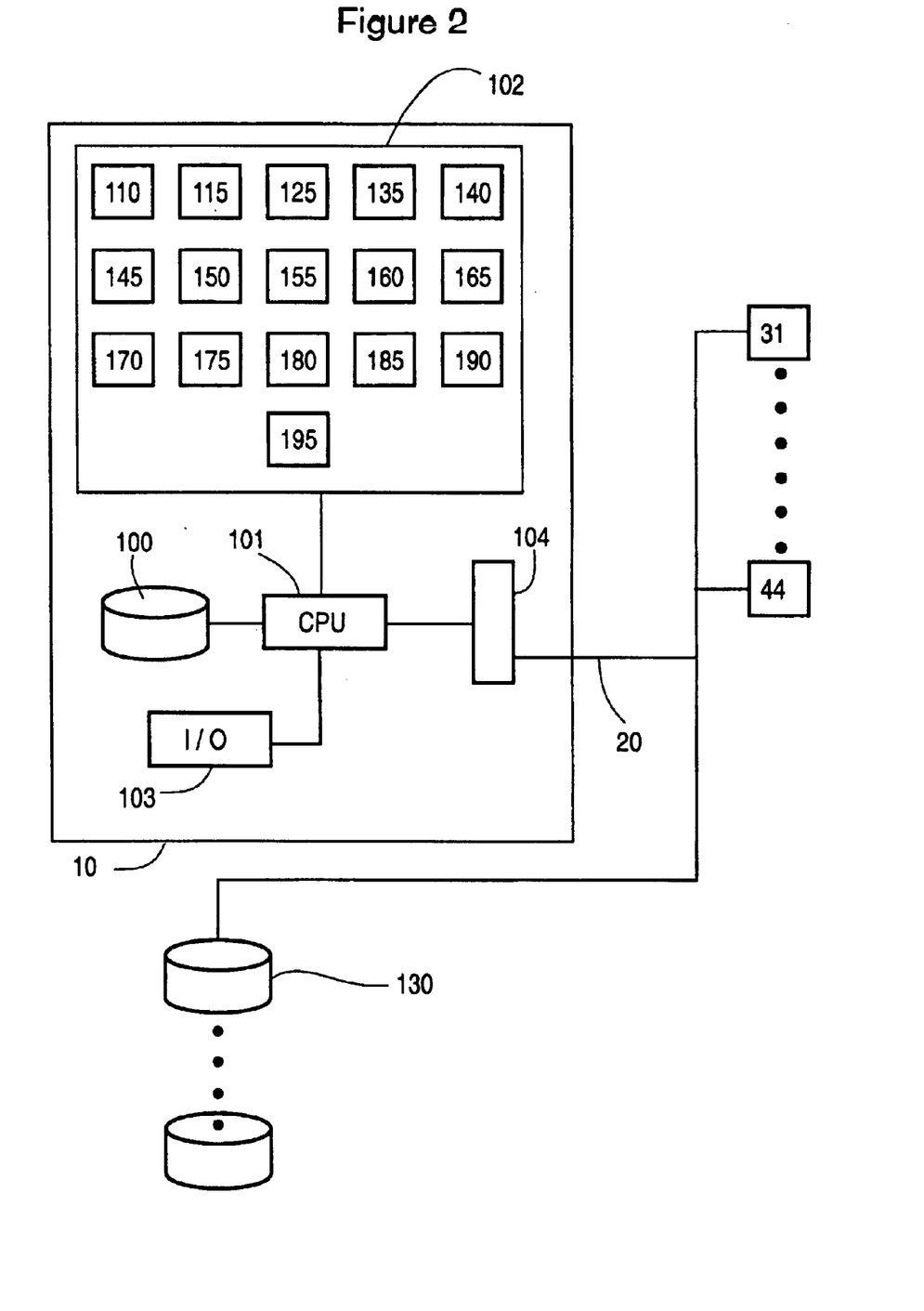
FIG. 2 is an exemplary block diagram of illustrating the operation of a system in accordance with the present invention.

FIG. 2 is a functional block diagram illustrating the operation of an exemplary embodiment of the system of the present invention. The exemplary embodiment shown in FIG. 2 includes a transaction processing system 10 further including a centralized repository 100 for storing data (e.g., a Direct Access Storage Device (DASD) storing a conventional relational database) and a general purpose computer having a CPU 101 and a memory 102 storing a plurality of software modules for carrying out the various functions performed by the transaction processing system 10 according to an embodiment of the present invention. In addition, the system 10 includes an I/O device such as a keyboard or mouse with an associated display device and a communications interface 104 providing an interface to communications network 20.

To facilitate the process of registering and recovering an asset (e.g., a property unit) or loan balance, the system according to an embodiment of the present invention acquires information about the property unit and the individual or entity involved in the transaction. For example, information about the property unit, individual, entity or terms of the transaction (e.g, loan value, interest rate) is acquired and stored in the central repository 100 of the system of the present invention at the time the property unit, individual or entity is financed or insured. For example, in a manner known in the art, the relational database forming the repository 100 can include tables for customer information (e.g., address, birth date, etc.), as well as description of the collateral or property unit, insured or financed, the lender or insurer, and the dealer, broker or other entity information entered into the central repository 100 via the Application/Customer Profile Module 110.

An Application/Customer Profile Module 110 according to an embodiment of the present invention captures and stores data about a customer and/or a property unit at the time the lender, insurer, customer or dealer/broker on behalf of a customer applies for a loan, financing, or insurance on a property unit. For example, the loan application process can be performed at a lender computer 41 located at a lender or insurer location (e.g., an automobile dealership or a lending institution office), thereby providing direct access of customer information into repository 100 via communication network 20 and Module 110. Lender computer 41 would include, for example, a client portion of the Profile Module 110 to enable communication with server portion of the Profile Module 110 resident on the transaction processing system 10. Alternatively, the software needed by a user of the system can be provided by the system 10 subject to, for example, an access control permission granting process. For example, when a user connects to the transaction processing system 10 via a dial-up or Internet connection, the user can be provided with a log-in and password to access the transaction processing system 10.

Accordingly, a dealer, broker, lender, insurer, individual, or entity can use the Profile Module 110 to provide the relevant transaction information to the transaction processing system 10. According to an embodiment of the present invention, a dealer or broker can interact with a designated lending institution or multiple lending institutions (e.g., with regard to obtaining customer financing for a vehicle purchase), and, for example, the office of the lending institution that actually finances the transaction (e.g., a particular branch of a lender) can be associated with the transaction via the central repository 100. Thus, performance of the lender, insurer, dealer/broker, or customer and the type of transactions being processed can be monitored via the transaction processing system 10.

As described above, information regarding the property unit and the customer (e.g., the person borrowing money or obtaining insurance in connection with the property unit) can be entered into the repository 100 via the Module 110. Such information is entered, for example, at a lender computer 41, an insurer computer 39, a dealer/broker computer 44 or any other user computer 43 (FIG. 1) and communicated to the system 10 of the present invention over the communication network 20. The interface for the Profile Module 110 can be implemented using, or example, a WINDOWS graphical user interface to facilitate the entry of information. The provision of information directly into the transaction processing system 10 eliminates the need to subsequently re-enter information about the transaction, thereby minimizing errors introduced due to transcription mistakes.

The Application/Customer Profile Module 110 can provide, for example upon completion of processing the transaction information (e.g., the capture of information for the property unit and customer), the information to be used in the adjudication process. For example, the required information for a lenders' or insurers' adjudication process can be extracted in a known manner from the central repository 100 via the Adjudication Extract Module 115 which could then download the information to, for example, the lenders, or insurers' proprietary adjudication process. A lender or insurer has the option to, for example, adjudicate and approve a transaction based on their own required specifications or utilize an Adjudication Module 185 provided according to an embodiment of the present invention employing conventional adjudication processes (e.g., credit scoring, risk rating). This information is communicated to, for example, the lender or insurer's computer system 41 or 39 via the communication network 20 (FIG. 1).

A Search Module 125 allows the lender or insurer to perform qualifying searches on a variety of available databases 130, such as, for example, the Department of State and Ministry of Consumer and Commercial Relations, including PPSA (in Canada the Personal Property Security Act), UCC (the U.S. Uniform Commercial Code), Land Titles & Registry, Bulk Sales, Corporate, Business and Partnerships; Department of Transport (MOT, DMV) including Licensing, tags and VIN; the Attorney General's Office, including the Sheriff's Department for writs, Family Court for divorces, Civil Court for Small claims, General, Divisional and Appeals, Criminal Court for convictions, Surrogate Court for Estates, Wills, Probates and Landlord/Tenant; the Receiver General's Office, Revenue Canada, IRS, Internal Revenue Service and Registrar's Office for change of name, births, deaths and marriages; Municipal offices for tax assessments, building codes and zoning; Federal Departments including the Official Receiver's Office, Federal Corporations and the Banking Authority for Debentures, FBDB (Federal Business Development Bank), Bank Act, Immigration (verification of status), Ships Registry and Aviation matters; the office of Superintendent of Bankruptcy, Official Receiver; Insurance claims; various credit bureaus; and utilities including telephone, cable, gas, electric and water.

The Search Module 125 will search, for example, those databases 130 that are relevant to the transaction being processed. In a conventional manner, the search may be automatically conducted (e.g., for a credit bureau search) or a lender or insurer may have to, for example, print an information screen from their host system and complete a search request form, transcribe the required search request information and forward the search request to a governing agency or agent to complete the search. This request form may be completed, for example, by telephone communication, facsimile, mail or hand delivery. The results of the search are then forwarded back to the lender or insurer for further manual processing and updating of their host system.

For example, if the transaction is a loan on a used vehicle, the Search Module 125 could, as part of the loan processing operation in Adjudication Extract Module 115 or Adjudication Module 185, perform a search of credit bureau databases, such as EQUIFAX, to verify the current credit status or confirm the credit history of the applicant. The Search Module 125 could also perform a lien search on the vehicle in various recording offices to ascertain that the vehicle being financed is not subject to a pre-existing lien or search a DMV database to insure that the vehicle information is accurate and that the vehicle is not stolen or identified as a total loss salvage. According to an embodiment of the present invention, not only can multiple search locations be searched quickly, as the central repository 100 is built up with various transactions, the central repository 100 can become a central searching location to ascertain the status of a property unit.

The Search Module 125 also could be utilized in a recovery operation to verify the current information of the applicant and identify any unknown liens or judgments against the applicant or property unit for proper and statutory recovery processing via, e.g., dial-up or Internet access to databases 130. Since an embodiment of the present invention utilizes a relational database as central repository 100, the results of the searches performed by Search Module 125 could be stored in tables associated with the transaction. The Search Module can, for example, provide the user with the current fees, charges and balances for the search costs on their account.

In the exemplary embodiment of the present invention shown in FIG. 2, the system also includes a Documents Module 165 which can, for example, generate digitally imaged or database generated documents along with providing warehousing and electronic delivery of documents such as, for example, contracts, mortgages, general security agreements, chattel mortgages, conditional sales contracts, leases, customer identification, policies, registrations, titles, statutory or other notices, bills of sale or any other documents deemed necessary or useful for processing and confirming a finance or insurance transaction. The documents delivered by the Document Module 165 can be made available, for example, subject to an access control permission granting process, to those who may require them for personal, audit or recovery reasons.

Digitally imaged documents can be generated by, for example, conventionally scanning a document and storing the scanned (e.g., digitally imaged) document in the central repository 100. Similarly, desired documents can be generated from the data stored in the central repository 100 using, for example, conventional SQL queries. In addition, the Documents Module 165 can provide database driven documents which are electronically generated and delivered to the required user in a standardized format consistent with the required specification of the particular lender or insurer based on the transaction type and jurisdictional variance of the transaction. For example, the same transaction document may require different terms in different jurisdictions.

Such documents are made available based on, for example, an access control permission granting process including authorization and the identity of the requesting party as well as the type of transaction contemplated for their use. If document imaging is performed at the client side of the system, then for example, imaged documents can be sent to the central repository via the communication network 20. For example, a recovery agent could submit digitally imaged photos of the recovered property unit for subsequent on-line use by an appraiser via the central repository 100.

According to an embodiment of the present invention, the documents made available to a user can vary as a function of the access control permission granted and identity of the user accessing the transaction processing system 10 and the type of transaction that is the subject of the process. For example, in a loan or insurance transaction a dealer/broker upon approval of the transaction from the lender or insurer could generate the required loan agreement or insurance policy for execution by the customer. Similarly, in the recovery process an agent could receive an assignment from the transaction processing system 10 and the documents needed by the recovery agent, such as the security agreement, copy of the registered security interest, seizure request, statutory notices, searches and instructions, would be provided. In contrast, a different set of documents, such as a bankruptcy secured proof of claim, security agreement and registered security interest, would be made available to a trustee in bankruptcy involved in the same transaction. The selection of particular documents can be performed, for example, using a look-up table that identifies the types of documents that can be provided to a dealer/broker or agent in particular areas of the transaction processing system 10. The access control permission process can include, for example, a login and password provided to a user that is associated with a profile for the user stored in transaction processing system 10. For example, a bailiff agent would have an associated profile in the system 10 that would authorize the bailiff access to particular accounts and documents.

A Registration, Filing and Reporting Module 135 allows lenders and insurers to register, file, report or transfer transactions on a property unit, individual or entity with the system 10 of the present invention. For example, as a function of the information stored in the repository 100 for a particular transaction, such as a customer's name, address, birth date, social insurance number, the Module 135 could automatically generate and file a lien registration in the appropriate recording office (e.g., a provincial or state county recording office). For example, for offices that accept electronic filings, the Module 135 could generate and transmit the appropriate electronic document or data via direct dialup or Internet access to the governing agency. If the recording office did not accept electronic filings, then the required information could be sent by Module 135 to a local agency who could generate the required registration form via, for example, the Documents Module 165 of the central repository 100 to manually complete the recording process.

Therefore, for example, information provided to the Application Customer Profile Module 110 is stored in the central repository 100 and the required information can then be accessed as an electronic file extract (e.g., a predetermined compilation of information from the central repository) by the Registration, Filing and Reporting Module 135, which then updates the relevant recording office's database 130 with respect to a transaction. Information regarding the registered, filed, reported or transferred transactions also can be stored in the repository 100, which can be subsequently searched on-line. Thus, according to an embodiment of the present invention, a single data storage area (e.g., central repository 100) can be searched electronically to identify recorded interests for an individual or transaction, whereas without the present invention, multiple recording offices would have to be searched, many manually, to accomplish the same search. According to an embodiment of the present invention, the public can be given limited access to search the registered information within the repository 100 through a public network such as the Internet. The Registration Module also can provide the user with the current fees, charges and balances for the registration costs on their account.

In the exemplary embodiment of the present invention shown in FIG. 2, the system also includes an Electronic Invoice, Billing and Payment Module 195, which can, for example, upon completion of a transaction, generate an invoice or billing to a customer for insurance premium or loan payments from information contained in the central repository 100. Payment Module 195 can include, for example, conventional off the shelf software to track payment history, provide electronic transmission of an invoice or generate hard copies of invoices. The underlying payment information would be uploaded, for example, from a lending institution.

A Recovery Module 140 allows any lender, insurer or agent to notify the transaction processing system 10 of a default condition with respect to a particular transaction and to assign and process any part of their transaction in the recovery of a property unit or loan balance. Thus, in the event of default, fraud or theft, the Recovery Module 140 allows a lender, insurer or agent to assign and report the recovery to the desired agent(s) and provides on-line access to selected information and documents from the central repository 100. Thus, with the Recovery Module 140 according to an embodiment of the present invention, a lender, insurer or agent can assign, communicate and follow up with the recovery process to any of a variety of agents involved in the recovery process.

Commissioned agents include, for example, asset managers, recovery agents/bailiffs, special investigators, skip locators, impound yards, shipping agents, appraisers, receivers, trustees, attorneys, property managers, real estate brokers, sales agents, escrow/title agents, adjusters, insurance agencies, collection agencies. A lender, insurer or agent can also communicate via the Recovery Module 140 with a variety of noncommissioned agents including, for example, police, customs, INS, Immigration, NICB, ICPB, INTERPOL, etc.

Thus, according to an embodiment of the present invention, the Recovery Module 140 allows for real time interaction between the lender or insurer and recovery agent. For example, the recovery agent receives the assignment online from the transaction processing system 10 and responds via the communication network 20 back to the system 10 of the present invention. The Recovery Module 140 also allows the lender or insurer to assign accounts to multiple agents by, for example, selecting the authorized agent from a pick list (e.g., a pull-down menu) and directing the agent, by way of an authorized instruction pick list (e.g., a pull-down menu for types of actions such as repossession or appraisal) to proceed with any particular requests identified in the instruction notes provided to the agent.

For example, the seizure of a property unit would be assigned to a recovery agent/bailiff after a skip tracer has located the security (property unit). Once the unit has been seized, an appraisal agent can be assigned to appraise the unit. After appraisal, a sales agent can be assigned to sell the unit. After the sale, if there is an outstanding balance due, an attorney or collection agency can be assigned for the collection of the balance. These interactions would take place via the Recovery Module 140 according to an embodiment of the present invention and provides for centralized automation of a process that prior to the present invention required multiple disparate operations that were not centrally coordinated with a common database to facilitate a lender's or insurer's recovery of a property unit or loan balance in the event of a default condition in a transaction.

As described above with reference to FIG. 1, the computer systems 31–44 of such agents are coupled to the system 10 of the present invention via a proprietary or public network 20. In addition, once a unit is seized or recovered, according to an embodiment of the present invention, the Recovery Module 140, in combination with the Documents Module 165, can automatically generate documents required regarding the transaction. For example, statutory notices required providing the debtor with a right of redemption or notice of sale of the security (property unit) can be automatically generated by the Documents Module 165 via information contained in the centralized repository 100 such as customer name, address, type of security agreement, agreement date, description of property unit and method of sale.

As mentioned above with regard to the Registration, Filing and Reporting Module 135, the Recovery Module 140 also preferably provides an interface that is tailored to each agent who interacts with the system of the present invention. In addition, certain features of the interfaces provided by the Recovery Module 140 might be common to more than one agent. For instance, the Recovery Module 140 can allow agents to electronically generate standardized invoicing for their services. The invoices can be provided to the party requesting the agent's services.

The system of the present invention can also facilitate the processing of appraisals using the Appraisal Module 180. The Appraisal Module 180 can be used, for example, in the adjudication stage or at the recovery stage. For example, when a property unit is being financed, insured, in default or stolen, the insurer or lender may choose to appraise the property unit to determine its value and condition prior to approval of the application or recovery. The Appraisal Module 180 will provide to the appraisal agent, for example, an interface that is tailored to the purpose of the appraisal agent. For example, the appraisal agent will receive a prescribed tailored form to complete an appraisal of a specified property unit along with other documents, such as authorization and instructions needed by the appraisal agent to accomplish the appraisal task. When the appraisal agent is ready to provide the appraisal, the system of the present invention will present the agent with, for example, an appraisal screen in which the appraisal agent enters information on a specified standardized form. The format for the appraisal screen, as well as other screens generated according to the present invention, can be generated using a conventional WINDOWS graphical user interface. The completed electronic form and digital photos (if any) from the appraiser are then transmitted to the requesting party (e.g., lender) and/or stored in the central repository 100. Different forms are also provided for different type of property units. Thus, the system of the present invention provides a form which is appropriate for the type of property (e.g., a motor vehicle, marine vessel, recreational vehicle, or real property would each have a unique form).

As mentioned previously, the various users of the system 10 of the present invention can be granted access control permission to different levels of access to the repository 100 and to the various documents and functions of the system. For example, the general public would be allowed to access public registration and search information but would not be allowed to access customer loan or insurance application data. Access to the latter data can be restricted, for example, to authorized lenders, insurers and agents.

A Recovery Search Module 170 provides, for example, limited public access to the central repository 100 for the searching and identification of property units which have been pledged as security, are pending recovery, stolen or are a total loss. Also, Module 170 could identify, for example, a writ of seizure and sale against a party in a specified jurisdiction. Access to the Recovery Search Module 170 may be direct or public (Internet) and thus anyone that identifies a property unit contained in the central repository 100 via the Recovery Search Module 170 could then contact the lender, insurer or recovery agent to report the location of the property unit and receive compensation for so doing (e.g., a reward). For example, a shipping agent could search, via Module 170, the vehicle identity number (VIN) of a vehicle about to be containerized for export and receive confirmation that the vehicle is stolen or, if the lender or insurer has changed the status of the transaction record for the vehicle to indicate a default, lien, or stolen status. The agent would then, for example, be requested to contact the lender, insurer, or recovery agent to arrange recovery of the property unit and to receive a reward.

A Business Intelligence Reporting Module 175 according to an embodiment of the present invention provides lenders and insurers the ability to analyze and view trends and generate reports from any selected information contained in the central repository 100. For example, reports are generated utilizing data from the central repository 100 and presented using a custom code (e.g., SQL queries written by the user) or business intelligence software such as COGNOS Powerplay or similar products. Examples of the types of business intelligence reports include, for example, defaults as a percentage of the loan portfolio, thefts or total losses as a percentage of policies issued, repossession by specific property unit, lender or branch of lender, thefts by property unit, geographic location of thefts by property unit, types of property units financed, dealer/broker transactions, etc. Business intelligence could also be used as a factor in the adjudication process. For example, vehicles having a high loss repossession rate can be identified and assigned a lower credit score for loans on such vehicles or certain vehicles experiencing a high theft rate or certain driver profiles with a high accident rate could be assessed a higher risk premium.

An Inventory Sales Module 190 provides for disposal of a property unit after its recovery. For example, a bankruptcy trustee, sales agent, liquidator, recovery agent or anyone empowered to sell a property unit can place the property unit in, for example, a database table of the central repository 100 for access by the public interested in purchasing the property unit. For example, once the property unit is provided to the Inventory Module 190, bids can be submitted electronically in the required format and a winning bid selected for acceptance and further processing. As the Inventory Module 190 is connected to the central repository 100, buyers or interested prospects can access, for example, the Appraisal Module 180 to review pictures and information about the property unit.

In an exemplary embodiment of the present invention, communication between the transaction processing system 10 and computers 31–44 is controlled by, for example, a queue manager. For example, when a transaction is directed to an agent (or multiple agents) from a lender or insurer computer 31, an agent is selected from an agent pick list (e.g., abc recovery agent), an instruction is selected from an instruction pick list (e.g., seize property unit) and the instruction is then sent electronically to the selected agent by the Recovery Module 140 (e.g, via communications network 20). The account instruction can also include, for example, a bring forward (BF) dateline for the expected completion of the transaction task requested and automatically queues a reminder to the agent if the account has not been updated and the transaction task has not been completed by the required deadline. It further provides the user a queue to identify a list of outstanding accounts requiring action.

This queue is indicated, for example, as a color-coded lightbulb icon at the agent's computer. For example, when instructions are sent or queued to the agent, the lightbulb icon will appear at the agent's computer screen. A different color lightbulb indicates the urgency and priority level of the instructions. The agent can retrieve the instruction by, for example, clicking on the lightbulb icon. As a result of clicking on the lightbulb icon, a work list of accounts appears in priority with instructions to be preformed by the agent. Clicking on a specific account links the agent to the particular account. The agent can then send or queue updates on the status of the account, request more information, or indicate completion of the assignment or transaction with the supporting information to the requesting client via the transaction processing system 10 by clicking on the required client selected from a client pick list and saving the request. Once the agent has sent the response or inquiry back to the client, a similar lightbulb icon will appear on the client computer to identify a transaction. In addition, notes (e.g., status updates) can be entered for a transaction by any party including the date, time and identity of the party generating the note. Further, these notes are stored as part of the transaction information in the central repository 100 and are available for use by other users of the transaction processing system 10.

The various modules described above according to an embodiment of the present invention can be implemented in software stored in the memory 102 of the transaction processing computer 10 according to an embodiment of the present invention and can be developed, for example, using any WINDOWS-based programming application such as Visual Basic, Delphi or Powerbuilder. Further, in a manner known in the art, computers 31–44 can include a complementary portion of the modules stored in the memory of computers 31–44 to enable interaction with the modules in a client-server architecture.

Figure 3:
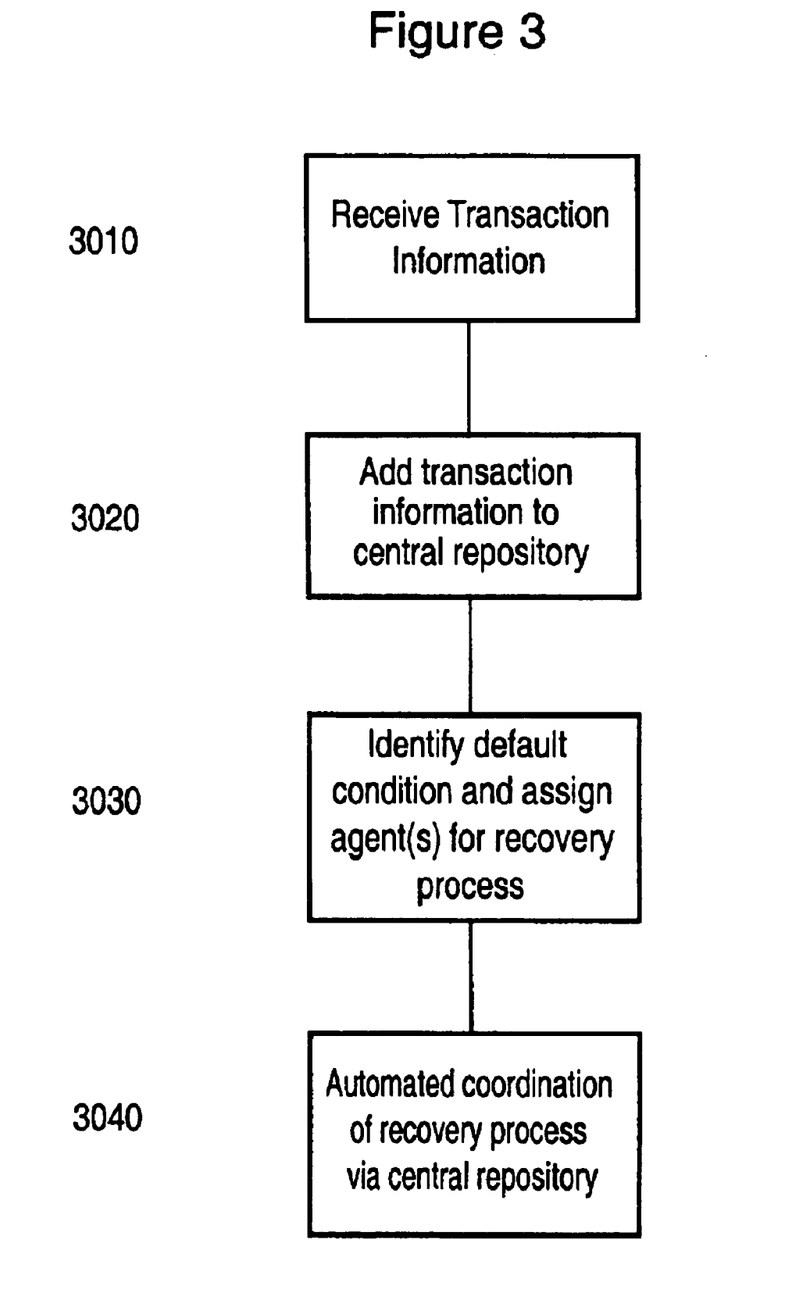
FIG. 3 is an exemplary flowchart of a transaction processing according to an embodiment of the present invention.

FIG. 3 illustrates an exemplary flowchart for an embodiment of the method for transaction processing according to an embodiment of the present invention. In step 3010, transaction information is received at, for example, the transaction processing system 10. For example, the transaction information includes the customer data as well as a description of the property unit involved in the transaction. The transaction can be provided to the system 10 via communication network 20 from a lender or insurer computer system 41. In step 3020, the transaction information is added to a central repository. The central repository includes, for example, a conventional relational database that is remotely accessible.

In step 3030, a default condition is identified and agent(s) are assigned to a recovery process. As described previously, a default condition includes a default on a loan balance or a theft of a property unit. The lender for the property unit can notify the transaction processing system 10 of the default condition, for example by a direct connection or Internet connection to the system 10 and interaction with the appropriate menu choices provided by the system 10. Also via the selection of appropriate menu choices, the lender can assign the required agents for the recovery process.

In step 3040, the recovery process is centrally coordinated by the transaction processing system 10 utilizing the central repository 100. As described previously, all of the information required for the recovery process is stored in central repository 100. Accordingly, agents involved in the recovery process can communicate electronically with the transaction processing system 10 to obtain the information necessary to carry out the assigned task as well as provide the results of each task to the central repository 100, where the information is available for use by other agents in the recovery process. As indicated previously, the access to the system 10 and the types of information provided to an agent is determined as a function of the identity (e.g., function) and access control permission granted by the client of the agent and the type of property unit involved in the transaction.

The method for transaction processing also allows other actions to be performed. For example, the storage of transaction information in a central location allows for searching in a single location to obtain information that otherwise would require multiple searches in disparate locations (e.g., multiple searches for lien jurisdictions in multiple jurisdictions are avoided according to an embodiment of the present invention). Also, the central repository of transaction information can be utilized prior to a default condition generate security interest documents tailored for particular jurisdictions and also automate the filing of the security interests automatically. The documents generated according to an embodiment of the present invention avoid manual transcription errors as the information is provided from the central repository.

What is claimed is:

1. A transaction processing system comprising a general purpose computer including a memory, a central processing unit and an input/output device, a data depository coupled to the general purpose computer, the memory of the general purpose computer including computer executable means having an application/customer profile information input module and a recovery module, the application/customer profile information module receiving transaction information for a transaction relating to a property unit which is stored in the data depository, the transaction information including relevant information regarding the property unit which is retrieved from and written to the data depository and the property unit including one of a personal property and a real property, the computer executable means further indicating a default condition for the transaction and initiating a recovery process of the property unit through said recovery module, the recovery process involving two or more actions specific to the property unit, said actions including locating, recovering possession of, managing, appraising and selling the property unit, said process involving services to be provided by a multiple of service providers, said recovery module receiving reporting information regarding the recovery process electronically over a communication network and providing automated coordination of the recovery process by coordinating communications with said multiple of service providers in response to the transaction information stored in the data depository, the transaction information being automatically updated with said reporting information to indicate a current status of the transaction, the automated coordination of the recovery module operating to automatically produce an output requiring action in response to the recovery module receiving the reporting information from one of the multiple service providers.

2. A transaction processing system as claimed in claim 1 wherein the computer executable means further includes a search module which provides communication links to conduct a search of at least one database via the communication network and stores the results of the search in the data repository as part of the transaction information.

3. A system as claimed in claim 2 wherein the computer executable means further includes a registration module which communicates information regarding the transaction to a public authority.

4. The system of claim 3 wherein the registration module is operable to receive public information associated by the public authority with the transaction and store said public information in the data repository as part of the transaction information, the transaction information including electronic copies of documents related to the transaction and the computer executable means further including a document module which retrieves said copies from the data repository and which generates from the data repository database driven documents relative to the transaction.

5. The system of claim 2 wherein the computer executable means further includes a payments module, the payments module providing at least one of payment history and invoice generation relating to the transaction.

6. The system of claim 3 wherein the public authority is one of the credit bureau and an official recording agent.

7. The system of claim 3 wherein the registration module is operable to receive public information associated by the public authority with the transaction and stores the public information in the data repository as part of the transaction information.

8. The system of claim 1 wherein the computer executable means further includes an appraisals module for processing appraisal information relating the property unit and recording relevant appraisal information as part of the transaction information.

9. The system of claim 8 wherein the computer executable means further includes an inventory sales module for processing the sale of the property unit.

10. The system of claim 1 wherein the transaction information includes customer information about a customer associated with the transaction and the computer executable means further includes a recovery search module providing limited public access to the data repository to search and access information stored therein relating to property units or customers.

11. The system of claim 10 wherein the customer information for a particular customer includes information regarding outstanding unit and seizure notices against such customer.

12. The system of claim 1 wherein the computer executable means further includes an adjudication extract module for extracting information from the data repository relevant to a financial institution that is considering entering into a transaction.

13. The system of claim 1 wherein the computer executable means further includes an adjudication module for receiving and assessing information relevant to a financial institution that is considering entering into a transaction.

14. The system of claim 1 wherein each of said service providers is assigned a predetermined database access status and the computer executable means further includes an access control module which controls access by said service provider to the data repository as a function of said access status.

* * * * *